(12) United States Patent
Hamada et al.

(10) Patent No.: US 6,198,731 B1
(45) Date of Patent: Mar. 6, 2001

(54) RADIOCOMMUNICATION APPARATUS, AND RADIOCOMMUNICATION SYSTEM

(75) Inventors: Hajime Hamada; Yasuyuki Oishi; Kazuo Nagatani, all of Kawasaki; Hidenobu Fukumasa, Yanai; Yoshihiko Asano, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/995,252

(22) Filed: Dec. 19, 1997

(30) Foreign Application Priority Data

Dec. 20, 1996 (JP) .................................................. 8-341192

(51) Int. Cl.[7] .................................................. H04B 7/216
(52) U.S. Cl. .......................... 370/335; 370/441; 370/342
(58) Field of Search .................................... 370/335, 342, 370/441, 479; 375/205, 206, 208

(56) References Cited

U.S. PATENT DOCUMENTS

| | | | |
|---|---|---|---|
| Re. 36,591 | * 2/2000 | Hayashi et al. ....................... | 370/342 |
| 5,224,122 | * 6/1993 | Bruckert .............................. | 375/200 |
| 5,497,395 | * 3/1996 | Jou ..................................... | 375/205 |
| 5,673,260 | * 9/1997 | Umeda et al. ....................... | 370/342 |
| 5,771,288 | * 6/1998 | Dent et al. ....................... | 375/206 X |
| 5,835,489 | * 11/1998 | Moriya et al. ....................... | 370/342 |
| 6,067,292 | * 6/2000 | Huang et al. ....................... | 370/342 |
| 6,081,516 | * 6/2000 | Yoshida et al. ..................... | 370/342 |

* cited by examiner

*Primary Examiner*—Melvin Marcelo
*Assistant Examiner*—Phuongchau Ba Nguyen
(74) *Attorney, Agent, or Firm*—Helfgott & Karas, P.C.

(57) ABSTRACT

There are disclosed a radiocommunication apparatus and a radiocommunication system. There are provided a receiving section capable of receiving a plurality of types of signals which have been spread through use of different spread code information according to a CDMA scheme in a transmitting-side radiocommunication apparatuses; and a spread demodulation section which carries out despread processing for the common signal portions of the plurality of types of signals received by the receiving section through use of a composite spread code formed from a plurality of spread codes. Accordingly, it becomes possible to significantly improve the quality of received signals.

19 Claims, 14 Drawing Sheets

FIG. 4

| | |
|---|---|
| CHIP RATE | 4.096 Mcps |
| SYMBOL RATE | 64 ksps |
| SPREAD CODE SERIES | ORTHOGONAL GOLD CODE |
| SPREAD MODULATION | OQPSK |
| INFORMATION MODULATION | QPSK |
| DEMODULATION SCHEME | PILOT SYMBOL INTERPOLATION SYNCHRONOUS DETECTION |
| PILOT SYMBOL SYNC. | 0.625 msec |
| ERROR CORRECTION SCHEME | CONVOLUTIONAL CODE (R=1/3, K=7) |
| TRANSMISSION POWER CONTROL SCHEME | SIR-BASE CLOSED-LOOP CONTROL |
| DIVERSITY SCHEME | 2-FINGER RAKE RECEPTION × 2-BRANCH MAX. RATIO COMBINING DIVERSITY |

RADIOCOMMUNICATION APPARATUS, AND RADIOCOMMUNICATION SYSTEM

BACKGROUND OF THE INVENTION

(1) Field of the Invention

The present invention relates to a radiocommunication apparatus and a radiocommunication system employing a direct spread CDMA (Code Division Multiple Access) communication scheme.

(2) Description of the Related Art

In recent years, a code division multiple access scheme employing spread spectrum communication—which is a multiple access scheme having a superior utilization efficiency of frequencies—has received attention as a transmission scheme for use in radiocommunication. This CDMA scheme is a leading candidate for the next-generation mobile communication system employed for radiocommunication between the base station and a plurality of mobile stations.

More specifically, the CDMA communication scheme is one in which multiple access is effected by spreading radio waves from each station through use of a high speed code inherent to the station. A transmitting-station transmits signals, while changing a spread code for each communication channel, at the same time over the same frequency band, and a receiving station reconstitutes only the information signal received over a communication channel assigned to the receiving station through use of its own spread code. A direct spread CDMA communication scheme is commonly employed, wherein the spectrum spreading is effected by modulating a carrier wave through use of a series of codes for spreading.

In a downward communication (communication from the base station to the mobile stations) of the direct spread CDMA communication scheme, signals are spread through use of different spread codes, and the thus-spread signals are transmitted to the mobile stations from the base station. The mobile station generally carries out despread processing for the received signal through integrate-and-damp process (or by correlation processing) of a code assigned to the mobile station (a spread code) and the received signal, whereby it obtains a desired wave.

FIG. 13 illustrates a radiocommunication system to which a common direct spread CDMA communication scheme is applied. A radiocommunication system 10 illustrated in FIG. 13 is comprised of a transmitter 7 connected to an antenna 7A, a receiver 8 connected to an antenna 8A, and a radio circuit 9 through which the transmitter 7 and the receiver 8 are connected together.

The transmitter 7 is comprised of a serial/parallel converter (S/P) 70, mixer circuits 71a and 71b, a control section 72, a spread code generator 73, transmission filters (TX filters) 74a and 74b, digital/analog converters (D/A) 75a and 75b, mixer circuits 76a and 76b, a voltage-controlled oscillator (a local oscillator) 77, a 90-degree phase shifter 78, an adder 79, and an amplifier (a low-noise amplifier) 17.

The mixer circuits 71a and 71b, the control section 72, and the spread code generator 73 function as a spectrum spreading section 52, whereas the mixer circuits 76a and 76b, the voltage-controlled oscillator 77, and the 90-degree phase shifter 78 function as a frequency converter (an up-converter: U/C) 53.

The receiver 8 is comprised of a hybrid device (H) 80, mixer circuits 81a and 81b, a voltage-controlled oscillator (a local oscillator) 82, a 90-degree phase shifter 83, receiving filters (RX filters) 84a and 84b, analog/digital converters (A/D) 85a and 85b, correlators 86a and 86b, a code generator 87, and a control section 88.

The mixer circuits 81a and 81b, the voltage-controlled oscillator 82, and the 90-degree phase shifter 83 function as a frequency converter (a down-converter; D/C) 62. Further, the correlators 86a and 86b, the code generator 87, and the control section 88 function as a spread demodulation section 89.

In the radiocommunication system 10 illustrated in FIG. 13 that has the previously-described circuit configuration, when a signal is transmitted from the transmitter 7 to the receiver 8, the serial/parallel converter 70 converts information data (serial data) into parallel data and divides the thus-converted parallel data into two signals. The mixer circuits 71a and 71b carry out spectrum spread processing for the parallel data. That is, the two thus-converted parallel data signals are subjected to spread spectrum processing through use of a signal which is generated by the control section 72 according to a spread code received from the spread code generator 73.

The signals having their spectra spread are then limited to a desired band by the transmission filters 74a and 74b. The signals are then converted into analog signals by the digital/analog converters 75a and 75b, and the frequencies of the thus-converted analog signals are converted by the frequency converter 53. More specifically, the frequency of a signal output from the digital/analog converter 75a is converted by the mixer circuit 76a through use of a signal (i.e., a local signal) which has a frequency corresponding to a signal received from the voltage-controlled oscillator 77. On the other hand, the frequency of a signal output from the digital/analog converter 75b is converted by the mixer circuit 76b through use of a signal from the 90-degree phase shifter 78, which shifts the phase of the signal from the voltage-controlled oscillator 77 through an angle of 90 degrees. These two signals having their frequencies converted are added by the adder 79, and a resultant signal is amplified by the amplifier 17. Then, the thus-amplified signal is transmitted from the antenna 7A in the form of radio waves.

In contrast, in the receiver 8, the signal received by the antenna 8A is divided into two signals by the hybrid device 80. The frequencies of the signals are converted by the frequency converter 62. At this time, the frequency of one of the two signals is converted by the mixer circuit 81a through use of a signal received from the voltage-controlled oscillator 82. The frequency of the other signal is converted through use of a signal from the 90-degree phase shifter 83, which shifts the phase of the signal from the voltage-controlled oscillator 82 through an angle of 90 degrees.

Subsequently, these signals are limited to a desired band by the receiving filters 84a and 84b, and they are converted into digital signals by the analog/digital converters 85a and 85b. The thus-digitally converted signals are subjected to despread processing performed by the spread demodulation section 89.

More specifically, the control section 88 of the spread demodulation section 89 performs determination of code timing and code selection through use of a spread code of the receiver itself generated by the code generator 87. The correlators 86a and 86b carry out despread processing based on the output from the control section 88 so as to output the despread information.

In the previously-described radiocommunication system 10, the transmitter 7 and the receiver 8 can be used; for example, as the base station (a master station) and the mobile station, respectively. Specifically, audio or data information is transmitted between one master station and a plurality of mobile stations. For example, as illustrated in FIG. 14, if information is transmitted to three mobile stations (MS) 8a, 8b, and 8c from the base station (BS) 7a, because signals can be multiplexed through use of codes according to the CDMA scheme, signals can be sent to all the mobile stations, 8a, 8b, and 8c, at the same time over the same frequency.

Further, the signals to be sent to the mobile stations 8a, 8b, and 8c are respectively comprised of an information portion (see arrow D in FIG. 14) and a common signal portion (see arrow E in FIG. 14). Contents which change according to the respective mobile station, 8a, 8b, or 8c (information to be sent to the mobile station 8a, information to be sent to the mobile station 8b, and information to be sent to the mobile station 8c) are written into the respective information portions.

In contrast, information common to the mobile stations 8a, 8b, and 8c are written into the respective common signal portions (i.e., hatched portions). An example of such a common signal is a pilot signal that is used in estimating a fading propagation path inherent to mobile communication. Each of the mobile stations 8a, 8b, and 8c carries out despread processing for a received signal by integrate-and-damp process of the code assigned to each mobile station and the received signal (the information portion and the common signal portion).

However, in the radiocommunication system 10 applicable to the previously-described CDMA scheme, the common signal portion of the signals sent to each of the mobile stations is despread by the mobile station through use of the spread code therefor. Therefore, each of the mobile stations cannot utilize a signal power of common signal portions sent to other mobile stations, inturn making it impossible to improve the signal-to-noise ratio (S/N) of the received signal.

SUMMARY OF THE INVENTION

The present invention has been conceived in view of the aforementioned drawbacks, and an object of the present invention is to provide a radiocommunication apparatus and a radiocommunication system capable of significantly improving the quality of a received signal by carrying out despread processing for a common signal portion of a received signal through use of a composite spread code formed from a spread code of the mobile station itself and spread codes of other mobile stations.

To this end, the present invention provides a radiocommunication apparatus which comprises a receiving section capable of receiving through an antenna a plurality of types of signals which have been spread through use of different spread code information items according to a CDMA scheme in a transmitting-side radiocommunication apparatuses; and a spread demodulation section which carries out despread processing for the common signal portions of the plurality of types of signals received by the receiving section through use of a composite spread code formed from a plurality of spread codes.

Further, the present invention provides a radiocommunication system which comprises a first radiocommunication apparatus capable of seconding a plurality of types of signals which have been spread through use of different spread code information items according to a CDMA scheme; and a second radiocommunication apparatus including a receiving section capable of receiving through an antenna the plurality of types of signals from the first radiocommunication apparatus, and a spread demodulation section which carries out despread processing for common signal portions of the plurality of types of signals received by the receiving section through use of a composite spread code formed from a plurality of spread codes.

In the radiocommunication apparatus and the radiocommunication system of the present invention, the common signal portions of the plurality of types of signals can be subjected to despread processing through use of a composite spread code formed from a plurality of spread codes. Therefore, it is possible to improve a signal-to-noise ratio of the received signal. Accordingly, the quality of the received signal can be significantly improved, thereby greatly contributing to improved performance of the radiocommunication apparatus.

BRIEF DESCRIPTION OF THE DRAWINGS

FIG. 4 is a table providing a specific example of specifications for simulation carried out in relation to the embodiment of the present invention;

DESCRIPTION OF THE PREFERRED EMBODIMENT (a) Description of Aspect of the Present Invention First, an aspect of the present invention will be described with reference to the accompanying drawings.

Figure 1:
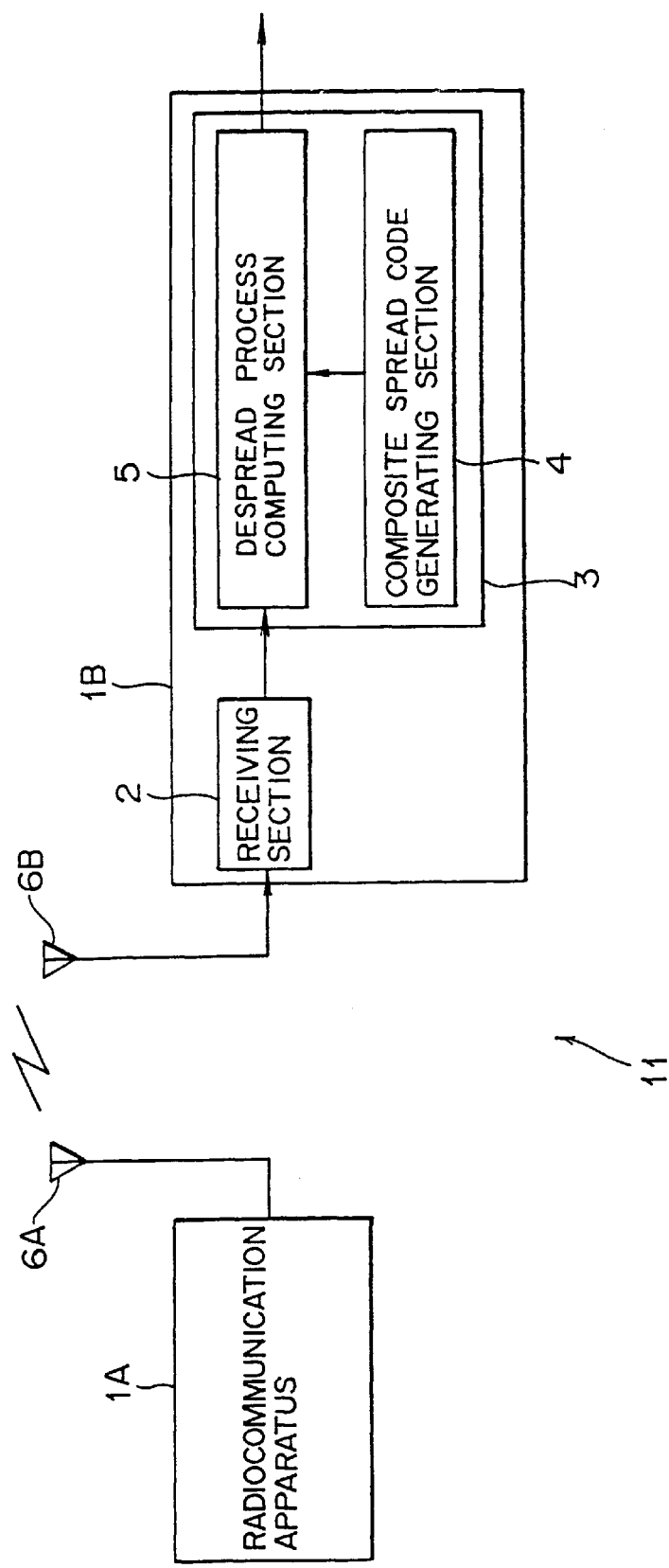
FIG. 1 is a block diagram showing an aspect of the present invention.

FIG. 1 is a block diagram illustrating the principle of the present invention. A radiocommunication system 11 illustrated in FIG. 1 is comprised of a first radiocommunication apparatus 1A, and a second radiocommunication apparatus 1B having a receiving section 2 and a spread demodulation section 3. The first radiocommunication apparatus 1A is capable of sending a plurality of types of signals that have been spread through use of different spread code information items according to a CDMA scheme.

The receiving section 2 is capable of receiving the plurality of types of signals from the first radiocommunication apparatus 1A by way of an antenna 6B. The spread demodulation section 3 carries out despread processing for common signal portions of the plurality of types of signals received by the receiving section 2 through use of a composite spread code formed from a plurality of spread codes.

The previously-described spread demodulation section 3 is comprised of a composite spread code generating section 4 for forming a composite spread code from a plurality of spread codes, and a despread processing computing section 5 which carries out despread processing for the common signal portions of the plurality of types of signals received by the receiving section 2 through use of a composite spread code generated by the composite spread code generating section 4.

The previously-described spread demodulation section 3 may perform despread processing through use of a composite spread code which is formed from a plurality of spread codes corresponding to at least a portion of the plurality of types of signals.

In this case, the previously-described spread demodulation section 3 may perform despread processing through use of a composite spread code which is formed from a plurality of spread codes corresponding to currently-used signals of the plurality of types of signals. Further, in this case, the previously-described spread demodulation section 3 may perform despread processing through use of a composite spread code which is formed from a plurality of spread codes corresponding to a portion of currently-used signals of the plurality of types of signals.

In the radiocommunication apparatus and the radiocommunication system of the present invention, the common signal portions of the plurality of types of signals can be subjected to despread processing through use of a composite spread code formed from a plurality of spread codes, thus making it possible to improve the signal-to-noise ratio of a received signal. Accordingly, the quality of the received signal can be significantly improved, thereby greatly contributing to improved performance of the radiocommunication apparatus.

Moreover, the previously-described spread demodulation section 3 may perform despread processing through use of a composite spread signal formed from a plurality of spread codes corresponding to at least a part of signals of the plurality of types of signals regardless of whether or not they are being currently used.

Accordingly, in the present invention, it is possible to carry out despread processing through use of a composite spread code formed from a plurality of spread codes corresponding to at least a portion of the plurality of types of signals regardless of whether or not they are being currently used. Therefore, it is not necessary to form a spread code corresponding to a received signal, and this in turn allows reduction of circuit size and renders the radiocommunication apparatus compact.

Further, the previously-described spread demodulation section 3 can be previously notified of information regarding a plurality of spread codes by the transmitting-side radiocommunication apparatus (the first radiocommunication apparatus). Alternatively, the previously-described spread demodulation section 3 can autonomously acknowledge the plurality of spread codes.

The previously-described spread demodulation section 3 may autonomously acknowledge a plurality of spread codes prior to the despread processing.

In this case, the spread demodulation section 3 may autonomously acknowledge a plurality of spread codes beforehand by executing predetermined computation with regard to the received signal with use of a plurality of spread code information items. In this case, the spread demodulation section 3 may autonomously acknowledge a plurality of spread codes beforehand by performing integrate-and-damp operations with regard to the received signal through use of a plurality of spread code items.

In a case where a Walsh code is used as a spread code, the spread demodulation section 3 may execute computation according to fast Hadamard transform as a predetermined computational operation.

In the present invention, it is also possible for the transmitting-side radiocommunication apparatus to notify the radiocommunication apparatus beforehand of information regarding a plurality of spread codes. With this arrangement, it is possible to quickly retrieve a code number corresponding to a received signal. Even in this case, it is possible to reduce the time required to retrieve the code number.

Further, in the present invention, it is possible for the radiocommunication apparatus to autonomously acknowledge a plurality of spread codes prior to the despread processing. Therefore, it is possible to reduce computational processing required to produce a composite code, thereby enabling reduction of the size of the radiocommunication apparatus. Consequently, it is possible to significantly improve the processing performance of the radiocommunication apparatus.

Moreover, the previously-described spread demodulation section 3 may autonomously acknowledge a plurality of spread codes sequentially at the time of despread processing. In this case, the result of the despread processing may be compared with a given threshold value, and a plurality of spread codes may be autonomously acknowledged sequentially on the basis of the result of such comparison. Alternatively, the result of the despread processing may be compared with predetermined SI ratio information, and a plurality of spread codes may be autonomously acknowledged sequentially on the basis of the result of such comparison.

In the present invention, the result of the despread processing is compared with a given threshold value (and predetermined SI information), and a plurality of spread codes can be autonomously acknowledged sequentially on the basis of the result of such comparison. Therefore, it is possible to perform despread processing more accurately, thus enabling improvements in the processing capability of the radiocommunication apparatus.

The previously-described plurality of types of signals may be signals spread by spread code information which is selected by the transmitting-side radiocommunication apparatus 1A in a predetermined order according to the CDMA scheme.

In the present invention, there can be used, as a plurality of types of signals, spread by spread code information selected by the transmitting-side radiocommunication apparatus in a predetermined order according to the CDMA scheme. Therefore, the amount of computation and the time required to retrieve a code number can be reduced, in turn making it possible to quickly determine a composite code.

(b) Description of Embodiment of the Present Invention

With reference to the accompanying drawings, an embodiment of the present invention will be described.

Figure 2:
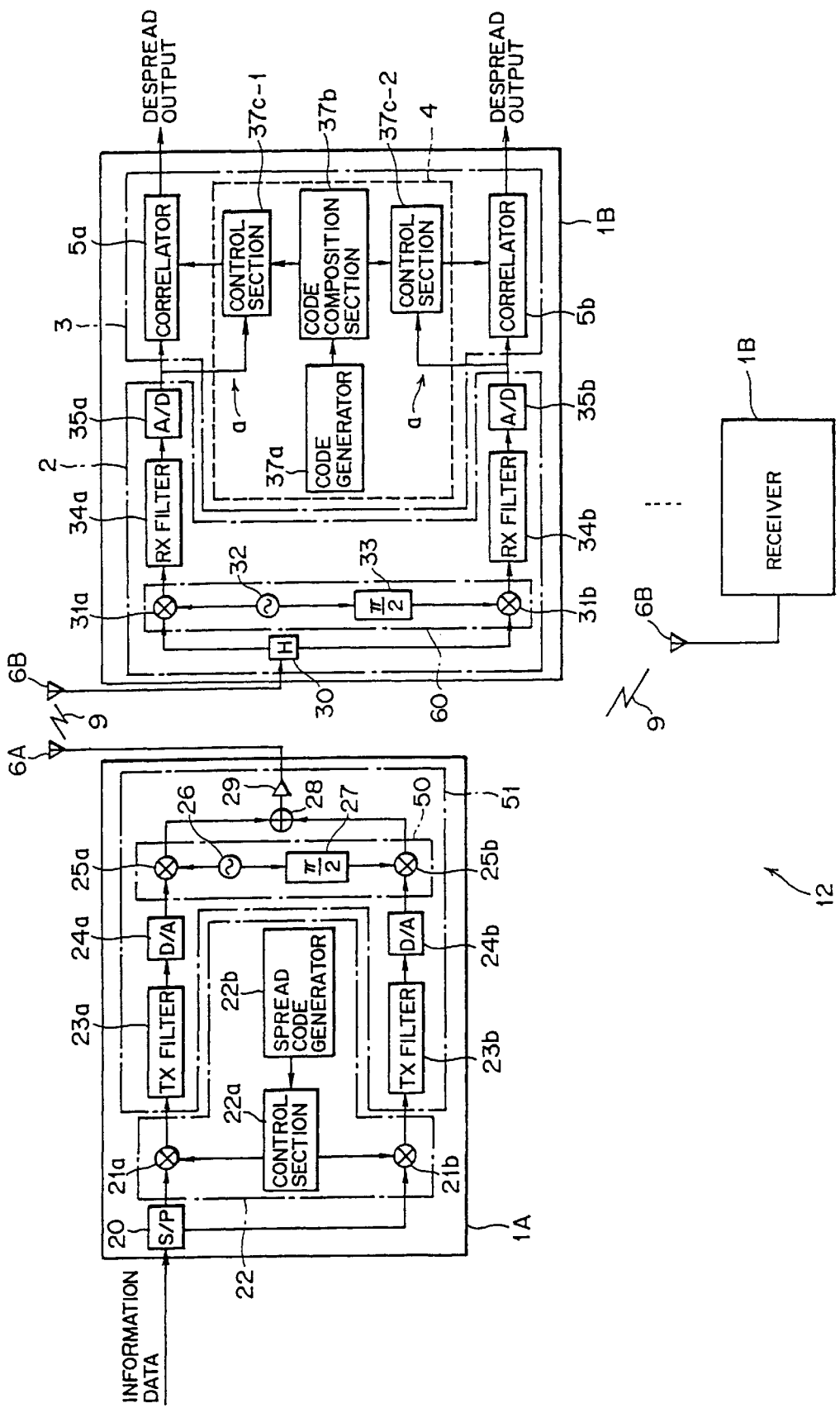
FIG. 2 is a block diagram illustrating the configuration of a radiocommunication system according to one embodiment of the present invention.

FIG. 2 is a block diagram illustrating a radiocommunication system according to one embodiment of the present invention. A radiocommunication system 12 illustrated in FIG. 2 is comprised of the transmitter (a first radiocommunication apparatus) 1A connected to an antenna 6A, a receiver (a second radiocommunication apparatus) 1B connected to an antenna 6B, and a radio circuit 9 through which the transmitter 1A and the receiver 1B are connected together.

The transmitter 1A is comprised of a serial/parallel converter (S/P) 20, mixer circuits 21a and 21b, a control section 22a, a spread code generator 22b, transmission (TX) filters 23a and 23b, digital/analog (D/A) converters 24a and 24b, mixer circuits 25a and 25b, a voltage-controlled oscillator (a local oscillator) 26, a 90-degree phase shifter 27, an adder 28, and an amplifier 29.

The mixer circuits 21a and 21b, the control section 22a, and the spread code generator 22b function as a spectrum spreading section 22. The mixer circuits 25a and 25b, the voltage-controlled oscillator 26, and the 90-degree phase shifter 27 function as a frequency converter (an up-converter: U/C) 50. Further, the up-converter 50, the transmission filters 23a and 23b, the digital/analog converters 24a and 24b, the adder 28, and the amplifier 29 function as a transmission section 51.

The serial/parallel converter 20 converts information data (serial data) into a parallel signal. The thus-converted parallel signal is divided into two signals. The mixer circuits 21a and 21b carry out spectrum spread processing for these two signals output from the serial/parallel converter 20 according to a signal output from the control section 22a, which will be described later.

The spread code generator 22b generates a spread code for spreading transmission data, and the control section 22a provides the transmission data with timing control according to a signal output from the spread code generator 22b. More specifically, the control section 22a controls transmission timing of an information portion and a common signal portion of the transmission data such as those previously described. The control section 22a serves as a notification processing section for reporting a code to be used.

In the spectrum spreading section 22, the mixer circuits 21a and 21b carry out spectrum spread processing of the transmission data for the respective mobile stations according to the spread signals for the respective mobile stations generated by the spread code generator 22b.

The transmission filters 23a and 23b limit the transmission data to a desired band, and the digital/analog converters 24a and 24b convert the transmission data (digital data) into analog data.

The mixer circuits 25a and 25b convert the frequencies of signals output from the digital/analog converters 24a and 24b. More specifically, the mixer circuit 25a converts the frequency of the signal output from the digital/analog converter 24a according to a signal (a local signal) that has a frequency corresponding to a signal received from the voltage-controlled oscillator 26, which will be described later. The mixer circuit 25b converts the frequency of the signal output from the digital/analog converter 24b according to the signal from the 90-degree phase shifter 27, which shifts the phase of the signal from the voltage-controlled local oscillator 26 by 90 degrees.

The voltage-controlled oscillator 26 produces a signal (i.e., a local signal) having a frequency according to a signal which corresponds to the input signal. As previously described, the thus-produced signal is output to the mixer circuit 25a. The 90-degree phase shifter 27 shifts the phase of the signal received from the voltage-controlled oscillator 26 by 90 degrees. As described above, the signal whose phase has been shifted through an angle of 90 degrees is output to the mixer circuit 25b.

The adder 28 adds together the signal output from the mixer circuit 25a and the signal output from the mixer circuit 25b. The amplifier 29 produces a high-frequency signal by amplifying a signal to be sent to the other radiocommunication apparatus 1B. For example, the amplifier 29 is made up of a low-noise amplifier. The signal amplified by the amplifier 29 is transmitted to the receiver 1B through the antenna 6A.

In contrast, the receiver 1B is comprised of a hybrid device (H) 30, mixer circuits 31a and 31b, a voltage-controlled oscillator (a local oscillator) 32, a 90-degree phase shifter 33, receiving filters (RX filters) 34a and 34b, analog/digital (A/D) converters 35a and 35b, correlators 5a and 5b, and a composite spread code generating section 4.

The mixer circuits 31a and 31b, the voltage-controlled local oscillator 32, and the 90-degree phase shifter 33 function as a frequency converter (a down-converter; D/C) 60. The down-converter 60, the receiving filters 34a and 34b, and the analog/digital converters 35a and 35b function as a receiving section 2. Further, the correlators 5a and 5b, and the composite spread code generating section 4 function as a spread demodulation section 3.

The hybrid (H) device 30 divides the signal received from the transmitter 1A through the antenna 6B into two signals. The mixer circuits 31a and 31b convert the frequencies of these two signals output from the hybrid device 30. Specifically, the mixer circuit 31a converts the frequency of the signal according to a signal output from the voltage-controlled oscillator 32, which will be described later. The mixer circuit 31b converts the frequency of the signal according to a signal output from the 90-degree phase shifter 33, which will be described later.

The voltage-controlled oscillator 32 produces a signal having a frequency according to a signal which corresponds to the input signal. As previously described, the thus-produced signal is output to the mixer circuit 31a. The 90-degree phase shifter 33 shifts the phase of the signal received from the voltage-controlled oscillator 32 by 90 degrees. As described above, the signal whose phase has been shifted through an angle of 90 degrees is output to the mixer circuit 31b.

The receiving filters 34a and 34b limit the received data to a certain band. The analog/digital converters 35a and 35b convert analog signals output from the receiving filters 34a and 34b into digital signals.

Thus, the hybrid device 30, the down-converter (D/C) 60, the receiving filters 34a and 34b, and analog/digital converters 35a and 35b, which as a whole serve as the previously-described receiving section 2, are capable of receiving by way of the antenna section (i.e., an antenna 6B) a plurality of types of signals which are spread through use of different spread code information items according to the CDMA scheme by the transmitting-side radiocommunication apparatus (or the transmitter 1A).

The correlators 5a and 5b perform despread processing according to signals output from control sections 37c-1 and 37c-2, thereby functioning as the despread computation section. More specifically, if the receiving section 2 receives the information portions of a plurality of types of signals, the correlators 5a and 5b carry out despread processing for the information portions through use of the spread code of the receiver itself. In contrast, if the receiving section 2 receives the common signal portions of the plurality of types of signals, the correlators 5a and 5b carry out despread processing for the common signal portions through use of a composite spread code (hereinafter often referred to as a "composite code") generated by the composite spread code generating section 4, which will be described later.

Further, the composite spread code generating section 4 outputs a spread code used in despread processing. If the information portions of the plurality of types of signals are received, the composite spread code generating section 4 generates an original spread code of the receiver. In contrast, if the common signal portions of the plurality of types of signals are received, the composite spread code generating section 4 forms a composite spread code from a plurality of spread codes. The composite spread code generating section 4 is comprised of a code generator 37a, a code composition section 37b, and the control sections (code control sections) 37c-1 and 37c-2.

The code generator 37a outputs a spread code, and the code composition section 37b outputs a spread code according to a signal output from the code generator 37a. If the information portions of the plurality of types of signals are received, the signal output from the code generator 37a is directly output to the control sections 37c-1 and 37c-2 (i.e., the code of the receiver itself is output). In contrast, if the common signal portions of the plurality of types of signals are received, a spread code is composed according to the signal output from the code generator 37a, and the thus-composed signal is output to the control sections 37c-1 and 37c-2 (i.e., a composite code is output).

The control sections 37c-1 and 37c-2 control the despread processing performed by the correlators 5a and 5b according to the spread code that has been subjected to required processing by the code composition section 37b. More specifically, the control sections control the timing of the code and can be implemented in the form of; e.g., a DSP or a digital circuit.

Specifically, with regard to the received signal, the control sections 37c-1 and 37c-2 in the composite spread code generating section 4 control the timing of input of the information portions directed to the respective mobile stations as well as input of the common signal portions common to all the mobile stations, based on the signals output from the analog/digital converters 35a and 35b (see arrow "a" in FIG. 2). Therefore, if the information portions are received, the composite spread code generating section 4 performs a control operation so as to carry out despread processing through use of the code of the receiver itself. In contrast, if the common signal portions are received, the composite spread code generating section 4 performs a control operation so as to carry out the despread processing through use of the composite code.

More specifically, if the common signal portions are received, the composite spread code generating section 4 performs composition as represented by Equation (1)

$$\text{``c'' composition } (k) = \Sigma c_i(k) (i \in A) \quad (1)$$

where "i" designates a code number, "A" designates a collection of code numbers corresponding to codes to be composed, and "$c_i(k)$" designates each code at time "k" before composition. Before they are composed, each code takes either "1" or "−1". The composite code becomes one of multiple values.

More specifically, the composite code represented by Equation (1) is formed by simply adding the $i^{th}$ code ($c_i$) at time "k." As a result, it is possible to linearly compose currently-used code as well as spread codes of the other mobile stations.

Since the common signal portions can be subjected to despread processing through use of the thus-linearly-composed composite code, the receiver can utilize signal powers for the other mobile stations, thereby allowing the respective mobile stations to obtain the common signal having a high signal-to-noise ratio.

There is no need of changing the circuit configuration with regard to the despread processing except that the code is multiple-valued. Therefore, the signal-to-noise ratio of the signal obtained from the common signal through the despread processing can be improved without increasing the amount of computation.

In this way, the spread demodulation section 3 carries out despread processing for the information portions of the plurality of types of signals received by the receiving section 2 through use of the spread code of the receiving station itself. In contrast, as represented by Equation (1), the spread demodulation section 3 carries out despread processing for the common signal portions of the plurality of types of signals through use of a composite spread code formed from a plurality of spread codes.

Figure 3:
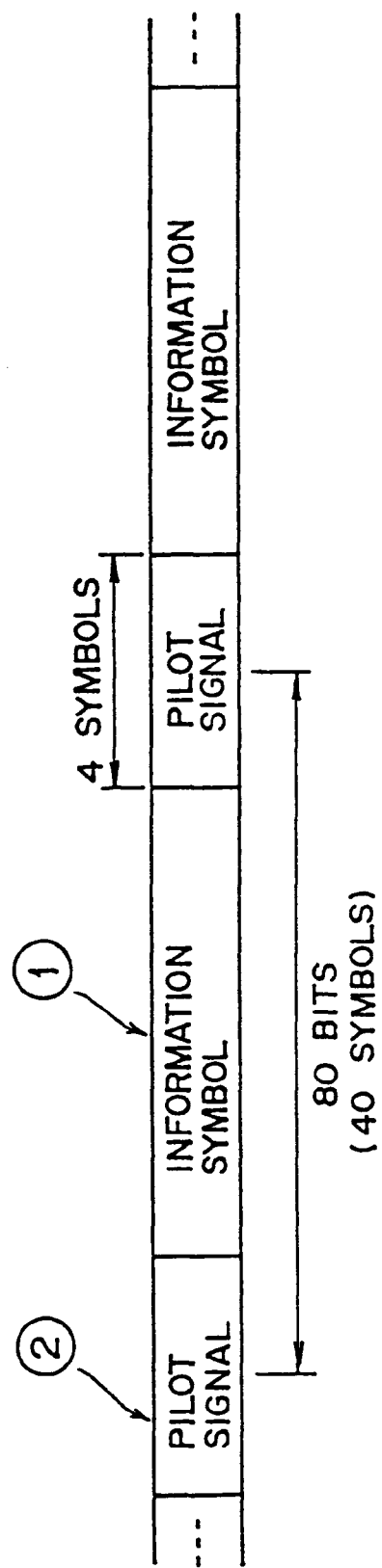
FIG. 3 is a schematic representation illustrating one example of a pilot signal used in the embodiment of the present invention.
Figure 14:
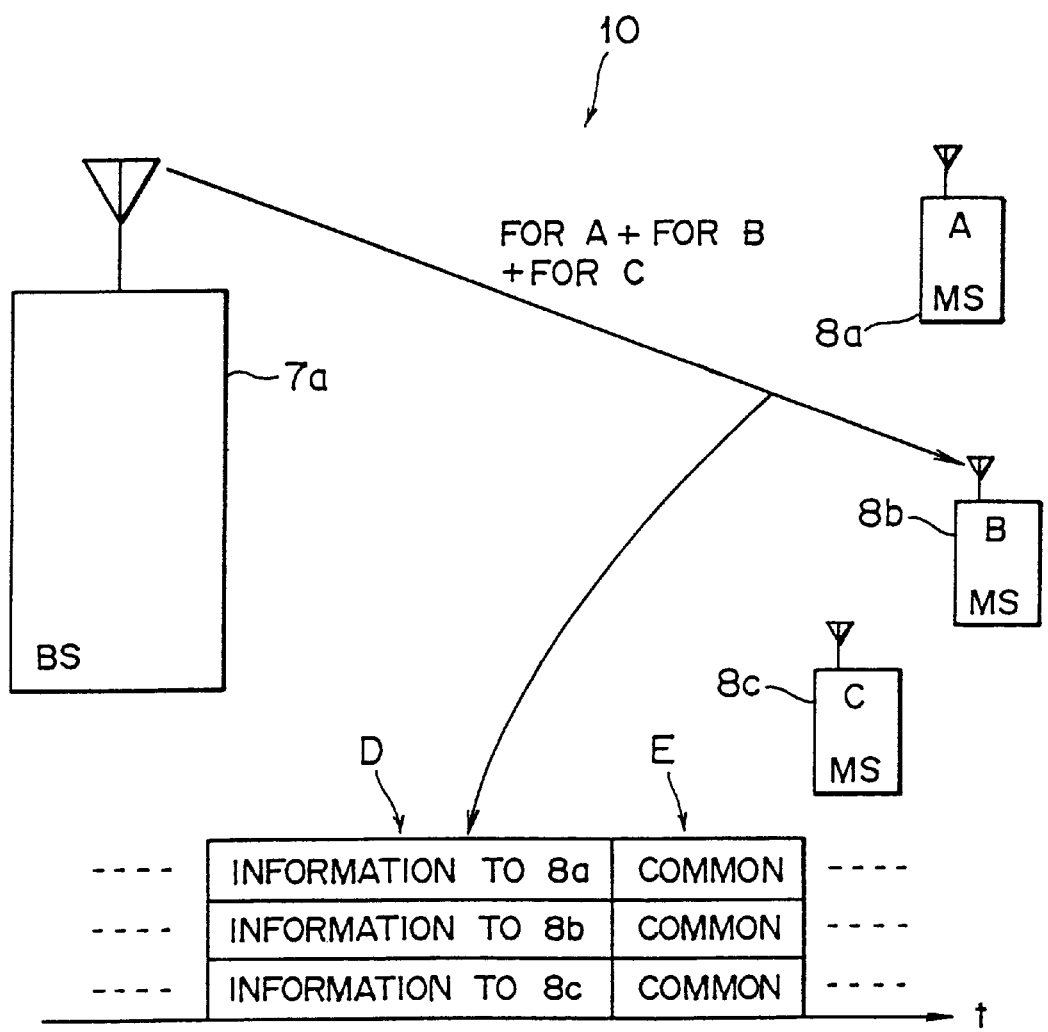
FIG. 14 is a schematic representation illustrating one example of transmission/reception of data performed by the common radiocommunication system.

The signal sent from the transmitter 1A has a configuration such as that illustrated in FIG. 3; namely, it is comprised of an information symbol (see arrow ① in FIG. 3) and a pilot signal (see arrow ② in FIG. 3). The common signal portion (see arrow E in FIG. 14) corresponds to the pilot signal. This pilot signal (i.e., a received pilot signal) is comprised of 4 symbols and is appended to the information symbol of 0.625 msec (equivalent to 40 symbols).

More specifically, contents of information written into the information symbol depend on each mobile station. The spread demodulation section 3 performs despread processing through use of the code of the station itself. The pilot signal is used as a control signal for estimating a fading propagation path inherent to mobile communication. The spread demodulation section 3 carries out despread processing for the pilot signal through use of the composite code formed from the codes of the respective mobile stations.

In other words, since a known signal (e.g., "0") sent from the receiver at uniform intervals is held in the receiver, the receiver can determine, based on the known signal and the pilot signal, distortion of the signal occurred in the propagation path reaching the receiver, thereby allowing compensation for the distortion of the information symbol portion A certain predetermined modulated symbol is commonly used as a pilot signal, and hence it is not necessary to change the pilot signal for each mobile station.

If the spread demodulation section 3 receives the common signal such as the previously-described pilot signal, it carries out despread processing for the thus-received common signal through use of a composite spread code formed from a plurality of spread codes corresponding to at least a portion of the plurality of types of signals. More specifically, the spread demodulation section 3 is arranged so as to be able to carry out despread processing for the common signal through use of a composite spread signal formed from a plurality of spread codes corresponding to the currently-used signals of the plurality of types of signals. Further, the spread demodulation section 3 can carried out despread processing for the common signal through use of a composite spread code formed from a plurality of spread codes corresponding to a portion of the currently-used signals of the plurality of types of signals.

In short, if the common signal portion is received, the spread demodulation section 3 can use a composite spread code corresponding to a plurality of types of signals to be subjected to despread processing, allowing output of a more accurate signal through despread processing.

There are the following three modes [i.e., methods (A) to (C)] as a mode (or method) for the previously-described spread demodulation section 3 to carry out despread processing for the common signal portion.

(A) In a case where the number of codes to be composed is fixed.

In this mode, the spread demodulation section 3 carries out despread processing for the common signal through use of a composite spread code formed from a plurality of spread codes corresponding to at least a portion of the plurality of types of signals regardless of whether or not they are being currently used.

More specifically, a predetermined number of codes are always composed regardless of the number of codes being practically used. In the composite spread code generating section 4 illustrated in FIG. 2, the code generator 37*a* generates a composite code formed from a predetermined number of codes. As a result, there is no need of providing the composite spread code generating section 4 with the code composition section 37*b*, and this enables reduction of circuit size of the overall spread demodulation section 3.

In a case where a fixed composite code is output as described above, the transmitting-side radiocommunication apparatus (or base station) may spread the plurality of types of signals according to the CDMA scheme through use of spread code information selected in a predetermined order. That is, in a case where the number of codes to be composed is fixed, it is desired that the transmitting-side station uses codes close to the codes determined by the receiving side. If the priority orders of codes have been determined on the transmitting-side, it is possible to perform judgment from the code having the highest priority, thereby reducing the amount of calculation.

Specifically, an example of an assigning method in which a priority order is imparted to each code when a composite code is determined is a method in which assignment is performed from the smallest code number. That is, the code number is incremented successively from the initial value, and when an unused code number is found, the thus-found code is assigned to as a composite code (in order of decreasing precedence). If the code number exceeds a usable code number, the code number is not assigned to the composite code.

In the present mode, a detailed explanation has been given of the case where assignment is successively performed from the smallest code number. However, the present invention is not limited thereto, and assignment may be performed successively from the largest code number. Further, assignment may be performed in the order arbitrarily determined by the user.

(B) In a case where the mobile station has been notified beforehand of information regarding a plurality of spread codes by the base station.

Although the code generator 37*a* of the spread demodulation section 3 generates a fixed composed code in the previous mode (A), it is also possible for the transmitting-side radiocommunication apparatus to notify the receiving-side station beforehand of information regarding a plurality of spread codes.

More specifically, the receiving station can perform despread processing by having beforehand received information regarding currently-used codes from the base station. That is, the receiving station is notified of the spread codes corresponding to all the signals being currently sent from the base station in the form of control information originated from the base station (e.g., notification information or the like). In this case, all of the codes can be composed through use of Equation (1).

Although the spread demodulation section 3 is arranged such that one mobile station performs communication using one code, one mobile station can carry out multi-code transmission through use of codes of a plurality of mobile stations currently being unused if the mobile station has to process a vast amount of communication. In this case, since the spread codes assigned to the slave and base stations are known, signals can be transmitted through up link (transmission of signals from the mobile stations to the base station) as well as through down link (transmission of signals from the base station to the mobile stations).

Next, a description will be given of a specific example (i.e., simulation) which verifies estimation of a propagation path with use of the pilot signal in order to evaluate the function of the spread demodulation section 3 of the present embodiment for the previously-described modes (A) and (B). In this simulation, variations in a bit error rate is examined in a system which has specifications as shown in FIG. 4 and in which despread processing is carried out.

The information symbol portion (see arrow ① in FIG. 3; 64 ksps) is spread 64 times, and the thus-spread data is transmitted at a chip rate of 4.096 Mcps. The pilot signal of four symbols and the information symbol of 0.625 msec (i.e., 40 symbols) are appended to each other alternately.

Figure 5:
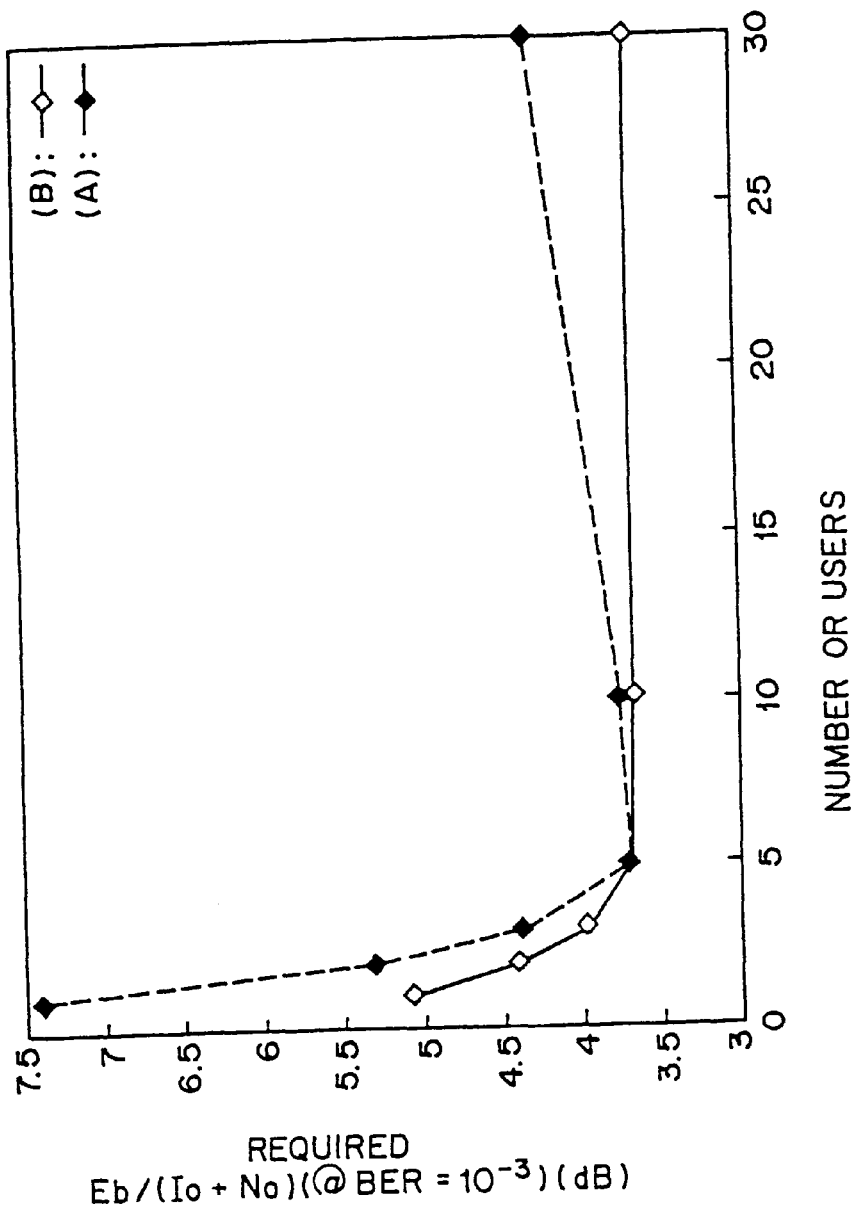
FIG. 5 is a graph showing the results of the simulation.

Results as shown in FIG. 5 were obtained under the previously described conditions. The result of measurement will be described on the basis of the data illustrated in FIG. 5. In FIG. 5, the horizontal axis of a graph represents the number of users, and the vertical axis of the graph represents $E_b/(I_0+N_0)$ to achieve a bit error rate $10^{-3}$.

For example, in the case of the previous mode (B) (see ◇ in FIG. 5)—provided that the receiving station has already been notified of the number of users currently performing transmission and the codes employed the transmission as a result of receipt of notification from the base station—$E_b/(I_0+N_0)$ of about 5 dB is usually required to achieve a bit error rate $10^{-3}$ if the number of users is one. This is the same as ordinary cases.

If the number of users is five, the bit error rate $10^{-3}$ is achieved when $E_b/(I_0+N_0)$ is about 3.7 dB because the despread processing is carried out using a composite code of the present invention. If the number of users is greater than five, the bit error rate ($10^{-3}$) is obtained at a constant $E_b/(I_0+N_0)$.

Further, in the case of the previous mode (A) (see ◆ in FIG. 5)—provided that the number of codes to be composed is fixed—, when the number of codes to be composed is fixed to five, $E_b/(I_0+N_0)$ to achieve the bit error rate $10^{-3}$ becomes greater than 7 dB if the number of users is one. In contrast to the mode (B), there is slight deterioration in the mode (A). However, if the number of users is greater than three, normal gain (or processing gain) is obtained. In other words, it is seen that the radiocommunication apparatus can be effectively used in the mode (A), as in the mode (B), if the number of users is greater than three.

As has been described above, it is possible to improve the signal-to-noise (S/N) ratio of the pilot signal by carrying out despread processing through use of the composite code. It is obvious that communication at lower $E_b/(I_0+N_0)$ becomes feasible, thereby verifying the effectiveness of the present invention.

(C) In a case where the mobile station itself autonomously acknowledges a plurality of codes Although the mobile station has been notified beforehand of the information regarding a plurality of spread codes by the base station in the foregoing mode (B), it is also possible to carry out despread processing by autonomous acknowledgment of a plurality of spread codes. In short, it is possible for the mobile station to identify codes without receiving any information from the base station. Methods (C1) to (C3) for autonomously identifying codes will be described in detail.

(C1) In a case where the mobile station autonomously acknowledges a plurality of spread codes beforehand In this mode, the spread demodulation section 3 is arranged so as to autonomously acknowledge a plurality of spread codes before carrying out despread processing. In this case, the spread demodulation section 3 is arranged so as to be able to autonomously acknowledge a plurality of spread codes beforehand by performing predetermined computational operations with regard to the received signal through use of the information regarding the plurality of spread codes.

For example, integrate-and-damp operation is carried out as the predetermined integral processing. Specifically, the spread demodulation section 3 has a function of autonomously acknowledging a plurality of spread codes beforehand by performing integrate-and-damp operations with regard to the received signal through use of the information regarding the plurality of spread codes.

More specifically, the control sections 37c-1 and 37c-2 of the composite spread code generating section 4 illustrated in FIG. 2 are provided with correlators for integrate-and-damp process (not shown). Further, the control sections are provided with; e.g., a storage section such as ROM (not shown) to store all the codes used in a corresponding base station. If a signal is received, the control sections 37c-1 and 37c-2 repeatedly carry out integrate-and-damp process with regard to all of the codes used in the corresponding base station.

The control sections 37c-1 and 37c-2 compose a code whose integrated value exceeds a predetermined threshold value and which is therefore determined as being currently used. When determination (composing process) has been completed for all the codes, the composite code obtained at that time is output as a composite code to be subjected to despread process.

Figure 6:
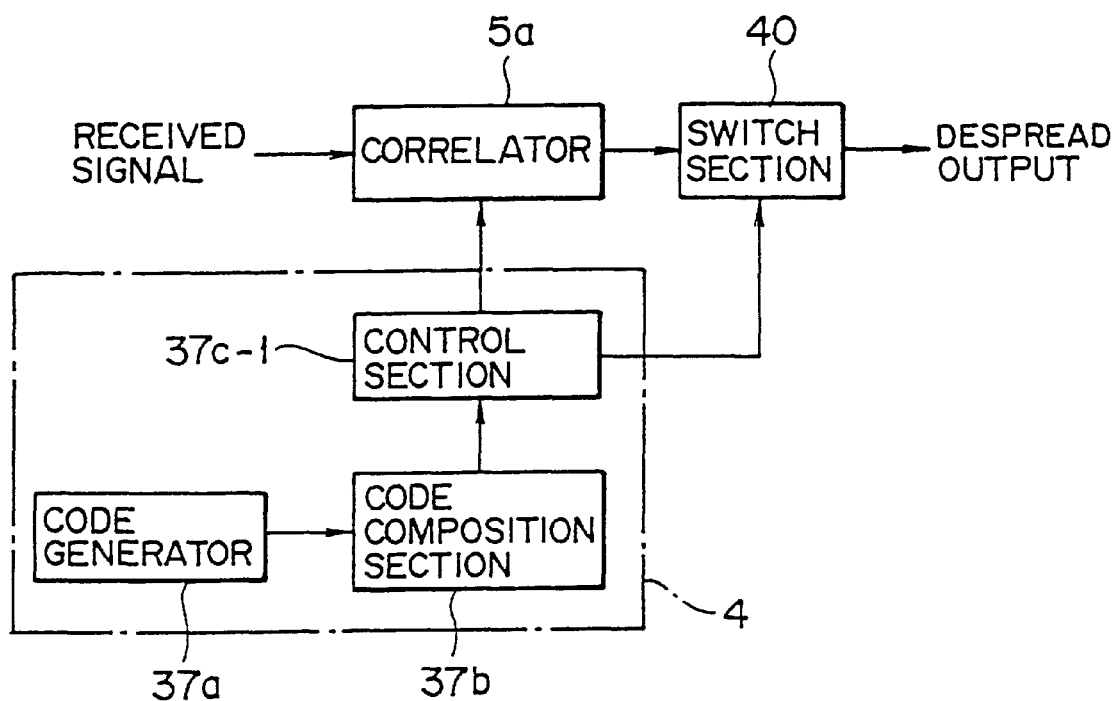
FIG. 6 is a block diagram illustrating the structure of a main portion of a spread demodulation section according to the embodiment of the present invention.

The correlators for integrate-and-damp process purposes provided in the control sections 37c-1 and 37c-2 may be used also as the correlators 5a and 5b for despread purposes. In this case, for example, a switch 40 as illustrated in FIG. 6 is provided subsequent to the correlator 5a. The switch 40 is switched so as to suspend output of a signal from the correlator 5a until the determination of all the codes has been completed. In contrast, when the determination of all the codes has been completed, the switch 40 is switched so as to output a composite code. The spread demodulation section 3 illustrated in FIG. 6 shows only one of the two branched signals, but the same applies to the other signal.

In a case where a Walsh code is used as the spread code, the spread demodulation section 3 performs computational processing according to FHT (Fast Hadamard Transform) as the predetermined computational processing. In this case, correlation operations are executed according to the Fast Hadamard Transform in lieu of repetition of integrate-and-damp process based on correlation processing, so that a correlation value is obtained. Codes to be composed can be determined from the thus-obtained correlation values. Consequently, the amount of computation can be reduced as in the previous modes.

(C2) In a case where the spread demodulation section autonomously acknowledges a plurality of spread codes sequentially In this mode, the spread demodulation section 3 is arranged so as to autonomously acknowledge a plurality of spread codes sequentially at the time of despread processing. In this case, the result of the despread processing is compared with a predetermined value. The spread demodulation section 3 can autonomously acknowledge a plurality of spread codes sequentially on the basis of the result of such comparison. Methods (C21) and (C22) for the spread demodulation section 3 for autonomously obtaining spread codes sequentially will be described in detail. (C21) In a case where the spread demodulation section autonomously acknowledges spread codes sequentially on the basis of a predetermined threshold value In the following descriptions, the result of despread processing is compared with a predetermined threshold value. The spread demodulation section autonomously acknowledges a plurality of spread codes sequentially on the basis of the result of such comparison. More specifically, the result of the despread processing is compared with the threshold value while the mobile station is carrying out ordinary receiving operation. If an output resulting from the despread processing is in excess of a predetermined threshold value, the output is a composite code.

Figure 7:
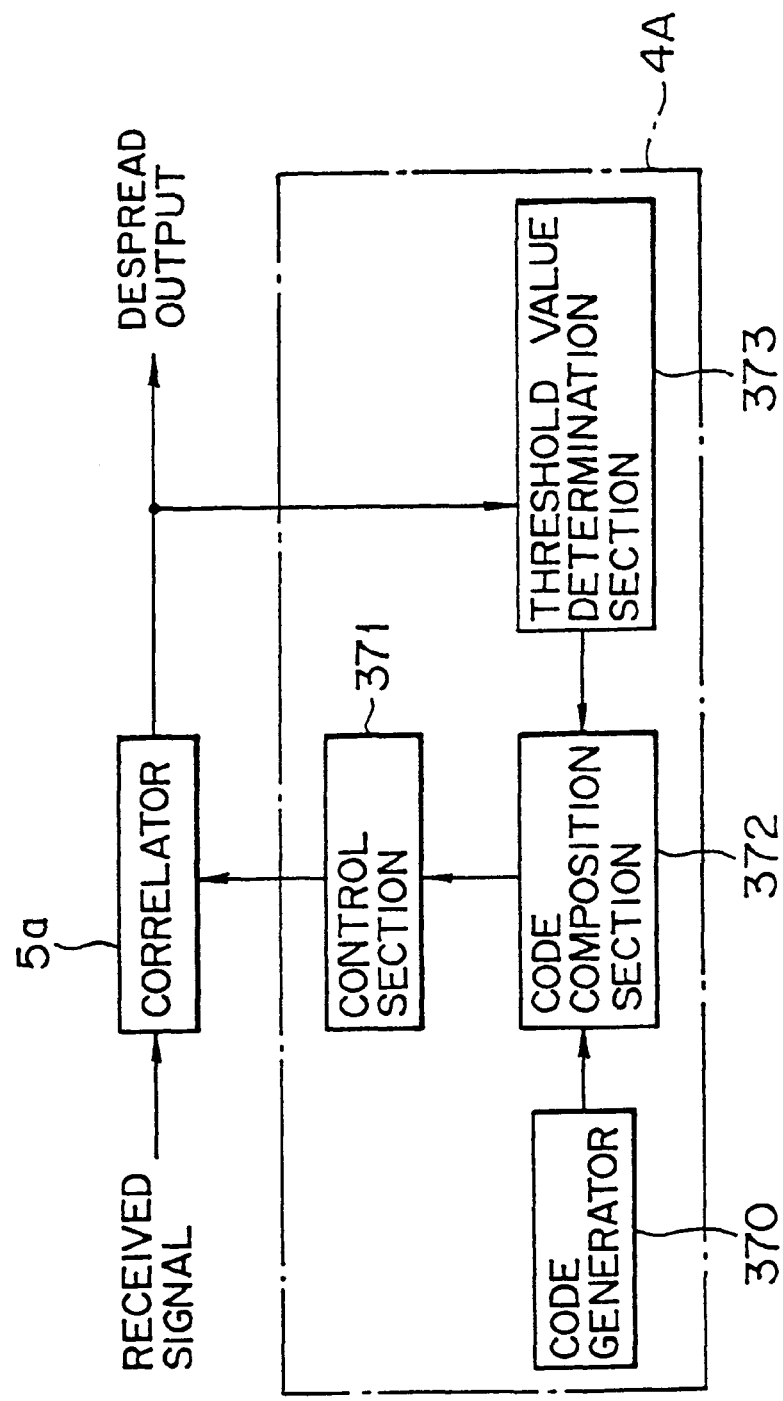
FIG. 7 is a block diagram illustrating the structure of a main portion of another spread demodulation section according to the embodiment of the present invention.

FIG. 7 is a block diagram illustrating the structure of a main portion of the spread demodulation section 3. In FIG. 7, reference numeral 4A designates a composite spread code generating section which is comprised of a code generator 370, a control section 371, a code composition section 372, and a threshold value determination section 373. In short, in addition to the code generator 37a, the code composition section 37b, and the control section 37c-1 of the composite spread code generating section 4 illustrated in FIG. 2, the composite spread code generating section 4A is further provided with the threshold value determination section 373. Even in this case, the spread demodulation section 3 illustrated in FIG. 7 illustrates only one of the two branched signals, but the same applies to the other signal.

The code generator 370 and the control section 371 function in the same way as do the code generator 37a and the control section 37c illustrated in FIG. 2. The threshold value determination section 373 constantly monitors and determines whether or not an output of the correlator 5a (and 5b) is in excess of a predetermined threshold value. The code composition section 372 forms a composite spread code on the basis of an output of the code generator 370 and an output of the threshold value determination section 373.

Specifically, in the composite spread code generating section 4A, at the beginning, despread processing is performed through use of only its own spread code in order to successively generate composite codes. Subsequently, when it is judged by the threshold value determination section 373 that the output of the correlator 5a (and 5b) exceeds a predetermined threshold value, the code composition section 372 composes the next spread code. When the output of the correlator 5a (and 5b) becomes smaller than the predetermined threshold value, the code composition section 372 does not compose a spread code (or suspends composition) and determines the next spread code (perform a test). When the output becomes smaller than the predetermined threshold value, the code composed immediately before this happens is deleted. As the codes are composed, the predetermined threshold value changes. Therefore, the threshold value is updated as the codes are composed.

When the correlator 5a (and 5b) performs despread processing, the spread demodulation section 3 illustrated in FIG. 7 sequentially forms composite codes with regard to the common signal portions. Particularly, the code composition section 372 forms a composite code from only signals determined by the threshold value determination section 373 through use of feeding back of the output from the correlator 5a. As a result, it becomes possible for the correlator 5a to perform the despread processing more accurately.

(C22) In a case where the spread demodulation section autonomously acknowledges spread codes sequentially on the basis of predetermined SI ratio information In this mode, the result of the despread processing is compared with predetermined SI (or S/N) ratio information, and the spread demodulation section 3 autonomously acknowledges a plurality of spread codes sequentially on the basis of the result of such comparison. More specifically, the result of the despread processing is compared with a threshold value based on the SI ratio information while the mobile station is carrying out ordinary receiving operation. If an output resulting from the despread processing is in excess of the threshold value based on the SI ratio information, the output is a composite code.

Figure 8:
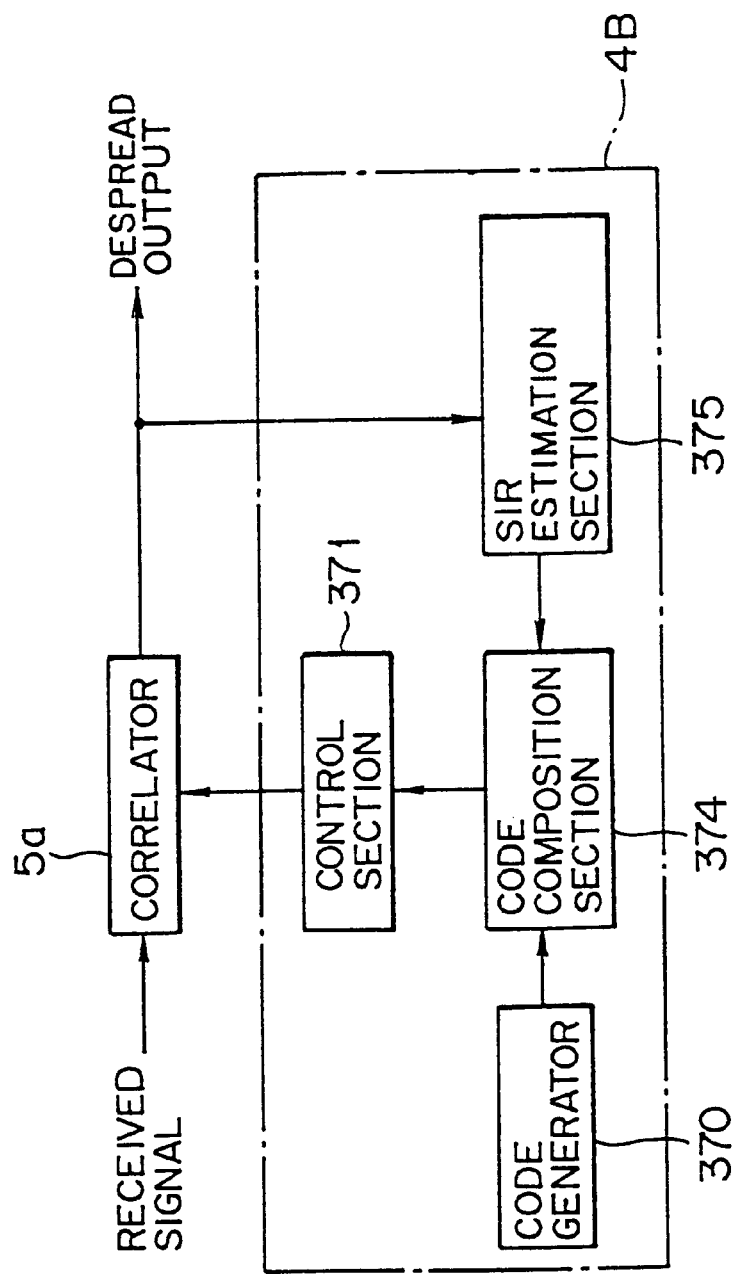
FIG. 8 is a block diagram illustrating the structure of a main portion of yet another spread demodulation section according to the embodiment of the present invention.

FIG. 8 is a block diagram illustrating the structure of a main portion of the spread demodulation section 3. In FIG. 8, reference numeral 4B designates a composite spread code generation section which is comprised of the code generator 370, the control section 371, a code composition section 374 and an SIR estimation section 375. In short, in addition to the code generator 37a, the code composition section 37b, and the control section 37c-1 of the composite spread code generating section 4 illustrated in FIG. 2, the composite spread code generating section 4B is further provided with the SIR estimation section 375. Even in this case, the spread demodulation section 3 illustrated in FIG. 8 illustrates only one of the two branched signals, but the same applies to the other signal.

The code generator 370 and the control section 371 function in the same way as do the code generator 37a and the control section 37c-1 illustrated in FIG. 2. The SIR estimation section 375 estimates an SIR value (Signal-to-Interference ratio: SI ratio information) from the output of the correlator 5a and constantly monitors and determines whether or not the output of the correlator 5a is in excess of a predetermined threshold value regarding the SIR value (or an estimated SIR value). The code composition section 374 forms a composite spread code on the basis of an output of the code generator 370 and an output of the SIR estimation section 375.

Even in this case, the composite spread code generating section 4B first performs despread processing through use of only its own spread code in order to successively generate composite codes. At this time, it is constantly monitored whether the output from the correlator 5a (and 5b) exceeds the predetermined threshold value for the SIR value. Only when the output from the correlator 5a (and 5b) exceeds the predetermined threshold value, the next composition is performed. On the other hand, when the output from the correlator 5a (and 5b) becomes smaller than the predetermined threshold value, the composition of the code is not performed (i.e., composition is stopped) and the next code is judged (a test is performed). Even in this case, if the outputs become smaller than the predetermined threshold value, the code composed immediately before this happens is deleted.

The spread demodulation section 3 illustrated in FIG. 8 estimates the SIR value obtained when the signal is received on the basis of the signal obtained after the despread processing. Composite codes are sequentially formed with regard to the common signal portions on the basis of the thus-estimated SIR values. Particularly, the code composition section 374 is arranged so as to form a composite code with regard to only the signal determined by the SIR estimation section 375 through use of feeding back of the output from the correlator 5a. Therefore, even in this case, it becomes possible for the correlator 5a to perform the despread processing more accurately.

As in the above-described the case (A), if the codes have already been prioritized by the transmitting side, it is possible to determine the codes in order of decreasing precedence, and this enables reduction of the amount of computation. Further, as described above, the assigning method in which a priority order is imparted to each code can be determined can be such that assignment is successively performed from the smallest code number. In this case as well, the present invention is not limited to the case where assignment is successively performed from the smallest code number, and assignment may be performed successively from the largest code number. Further, assignment may be performed in the order arbitrarily determined by the user.

Despread processing performed by the radiocommunication apparatus and the radiocommunication system having the previously-described configuration will be briefly described hereinbelow. As illustrated in FIG. 2, in the transmitter 1A, information data is divided and converted into two parallel signals by the serial/parallel converter 20. The frequencies of these two signals are converted by the mixer circuits 21a and 21b according to a control signal received from the control section 22a. These signals are then limited to a certain band by the transmission filters 23a and 23b. Then, the signals are converted into analog signals.

The signals are then converted into digital data by the analog/digital converters 24a and 24b, and the frequencies of resultant two lines of data are converted according to the control signal received from the voltage-controlled oscillator 26 as well as to the signal which is received from the voltage-controlled oscillator 26 after the phase of the signal has been shifted through 90 degrees. The signals whose frequencies have been thus converted are added together, and a resultant signal is amplified by the amplifier 29. The thus-amplified signal is sent to the receiver 1B through the antenna 6A.

Subsequently, the receiver 1B receives the signal from the transmitter 1A through the antenna 6B. After the thus-received signal has been divided into two signals, the frequencies of these two signals are converted according to the control signal received from the voltage-controlled oscillator 32 as well as to the signal which is received from the voltage-controlled oscillator 32 after the phase of the signal has been shifted through 90 degrees. The frequencies of the resultant signals are converted, and the signals are then limited to a certain band by the receiving filters 34a and 34b.

The signals whose bands have been limited are converted into digital signals.

In the spread demodulation section 3, the correlators 5a and 5b perform despread processing according to their own spread codes received from the control sections 37c-1 and 37c-2 if a received signal is an information portion. In contrast, if the received signal is the common signal portion, the correlators 5a and 5b perform despread processing according to the composite spread code received from the composite spread code generating section 4, thereby outputting a code for despread processing.

The spread demodulation section 3 can carry out despread processing for the common signal portion according to various method such as those [(A) to (C)] provided below.

(A) Processing carried out when the number of codes to be composed is fixed.

In the processing carried out when the number of codes to be composed is fixed, the code generator 37a of the composite spread code generating section 4 outputs a given fixed composite spread code, and the control sections 37c-1 and 37c-2 control despread processing performed by the correlators 5a and 5b, thereby outputting a signal obtained through the despread processing.

In this way, according to the radiocommunication apparatus 1B of the present embodiment, when the receiver receives the common signal portion, it is possible to carry out despread processing through use of a composite spread code formed from a plurality of spread codes corresponding to at least a portion of the plurality of types of signals regardless of whether or not they are being currently used. Therefore, it is not necessary to form a spread code corresponding to the received signal, which in turn allows reduction of circuit size and renders the radiocommunication apparatus compact.

(B) Processing carried out in the case where the mobile station has been notified beforehand of information regarding a plurality of spread codes by the base station.

Figure 10:
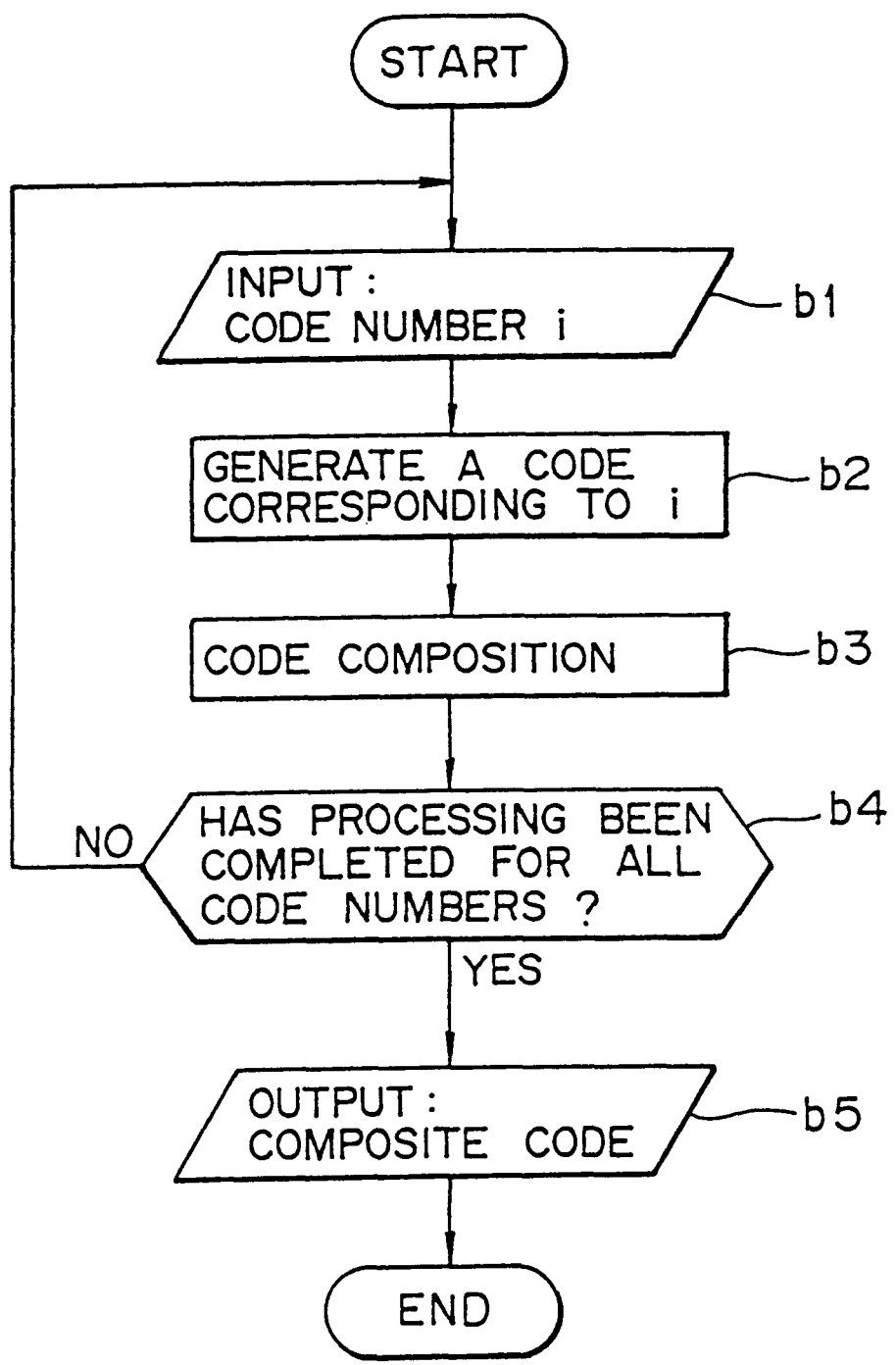
FIG. 10 is a flowchart for explaining another example of the despread processing performed by the spread demodulation section according to the embodiment of the present invention.

According to a flowchart (steps b1 to b5) illustrated in FIG. 10, an explanation will be given of operation of the spread demodulation section 3 performed when the mobile station receives from the base station the information regarding currently-used codes.

First, when the code number "i" is received from the base station (step b1), the composite spread code generating section 4 generates a code (spread code) corresponding to the code number "i" (step b2). The thus-generated code is composed (added) in the code composition section 37b (step b3). Subsequently, it is determined whether or not composition of all the codes corresponding to the code number has been completed (step b4). If the composition of all the codes corresponding to the code number has been completed (YES in step b4), the result of such composition is output as a composite code (step b5). In contrast, if the composition of corresponding codes is not completed (NO in step b4), the generation of a code corresponding to the code number i is performed again (step b2).

As described above, according to the radiocommunication apparatus 1B of the present embodiment, it is also possible for the transmitting-side radiocommunication apparatus to notify a mobile station of information regarding a plurality of spread codes. Therefore, it is possible to immediately retrieve a code number corresponding to a received signal. Even in this case, it is also possible to reduce the time required to retrieve the code number.

(C) Processing carried out in the case where the mobile station autonomously acknowledges a plurality of codes.

Figure 11:
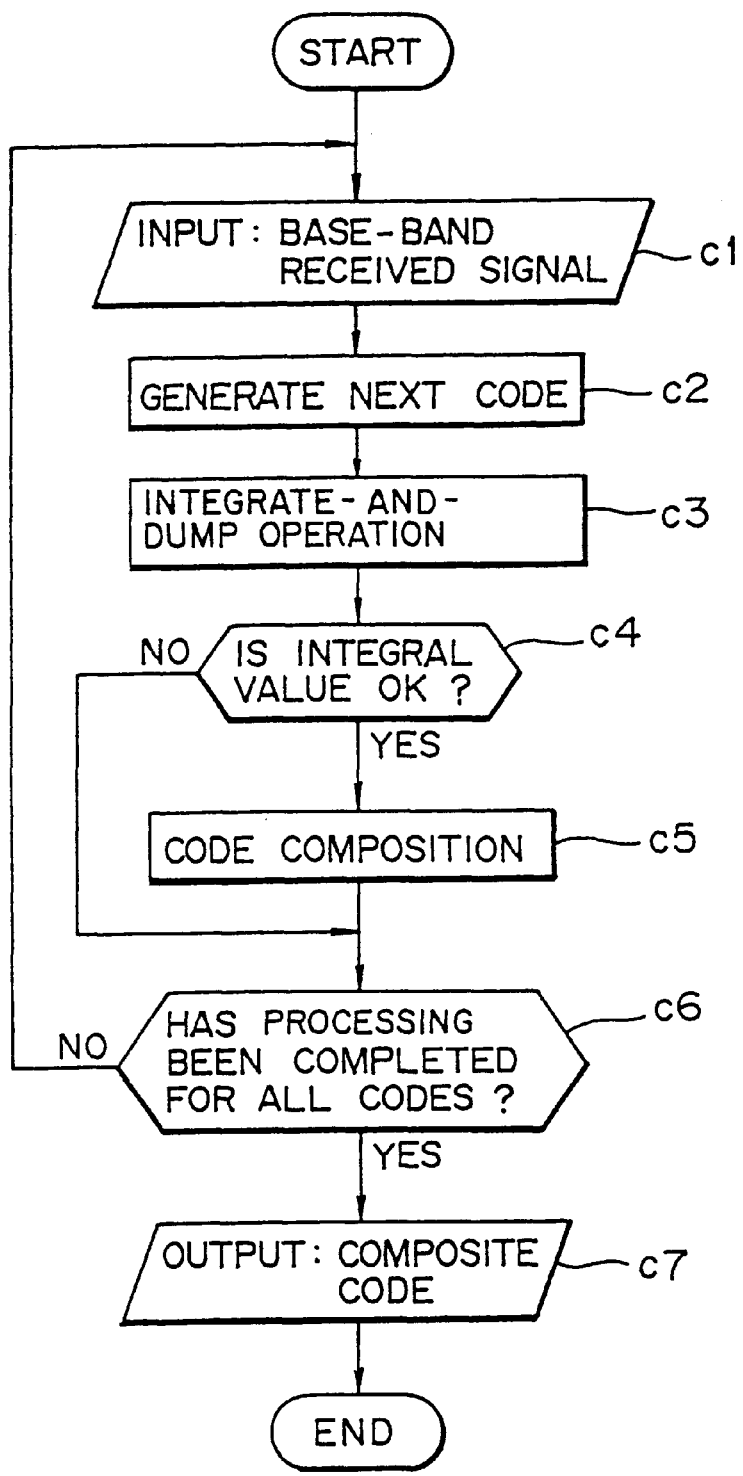
FIG. 11 is a flowchart for explaining yet another example of the despread processing performed by the spread demodulation section according to the embodiment of the present invention.

According to a flowchart (steps c1 to c7) illustrated in FIG. 11, an explanation will be hereinbelow given of operation of the spread demodulation section 3 in a case where the mobile station autonomously obtains a code and, more particularly, the operation of the spread demodulation section 3 in a case where the mobile station autonomously acknowledges a plurality of spread codes beforehand.

First, when a baseband received signal enters the spread demodulation section 3 (step c1), a code corresponding to the next code number is generated (step c2). Then, integrate-and-dump operation is performed for the thus generated code (step c3).

It is determined whether or not an integral value resulting from integrate-and-dump operation is greater than a given threshold value (step c4). If the integral value is greater than the given threshold value (YES in step c4), composition is performed for the code judged as being currently used (step c5). If the integral value is not greater than the given threshold value (NO in step c4), a composite code is not formed. Subsequently, it is judged whether or not all of the codes have been determined (step c6).

As a result of judgment as to whether or not all of the codes have been determined (step c6), if the determination of all the codes has been completed (YES in step c6), a composite code is output (step c7). In contrast, if the determination of all the codes has not been completed yet (NO in step c6), the code generation process is performed again for the received signal (step C2).

As described above, according to the radiocommunication apparatus 1B of the present embodiment, it is possible for the mobile station to autonomously acknowledge a plurality of spread codes beforehand. Therefore, it is possible to reduce computational processing required to produce a composite code, thereby enabling reduction of the size of the radiocommunication apparatus. Consequently, it is possible to significantly improve the processing performance of the radiocommunication apparatus.

Figure 12:
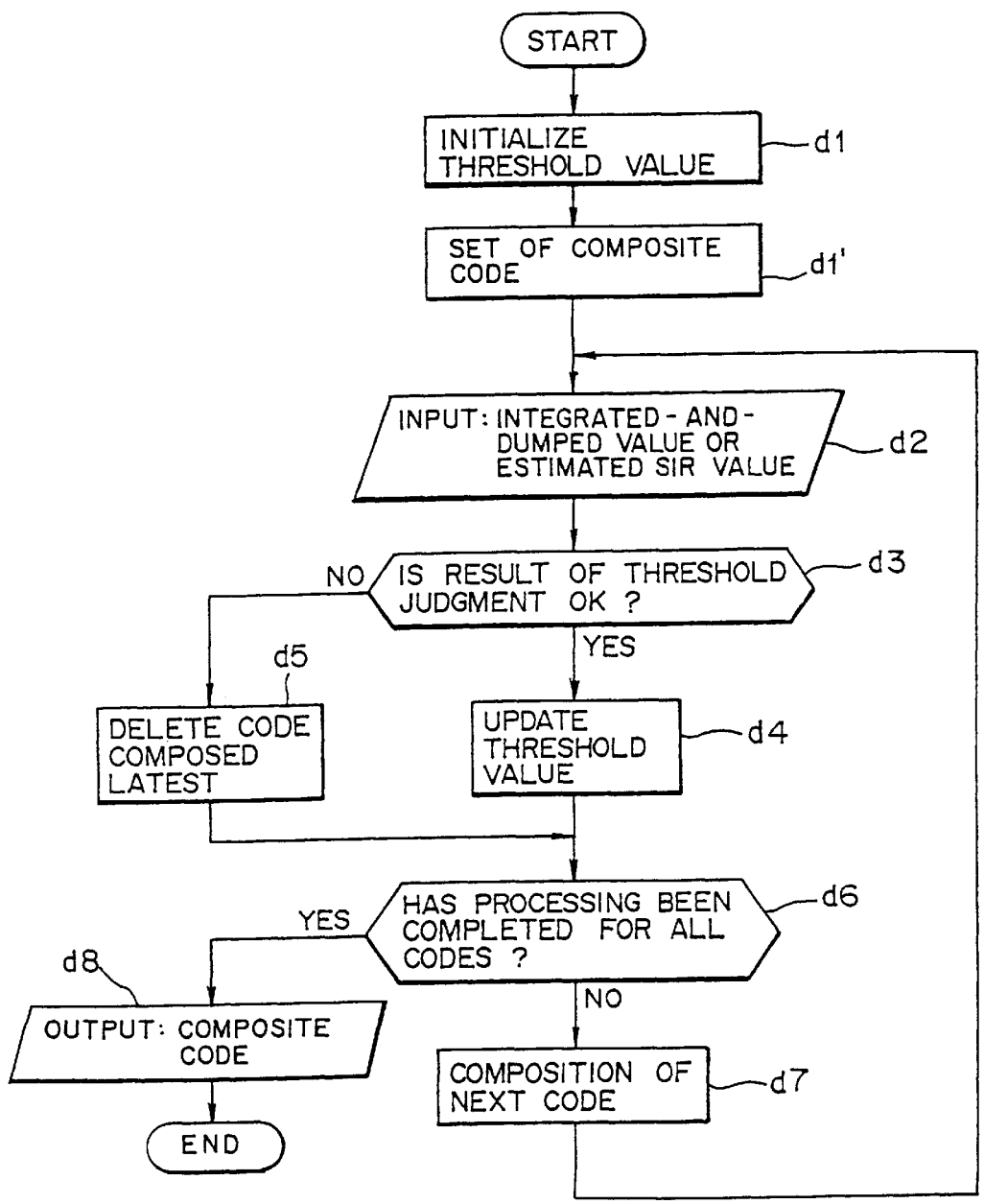
FIG. 12 is a flowchart for explaining still another example of the despread processing performed by the spread demodulation section according to the embodiment of the present invention.
Figure 13:
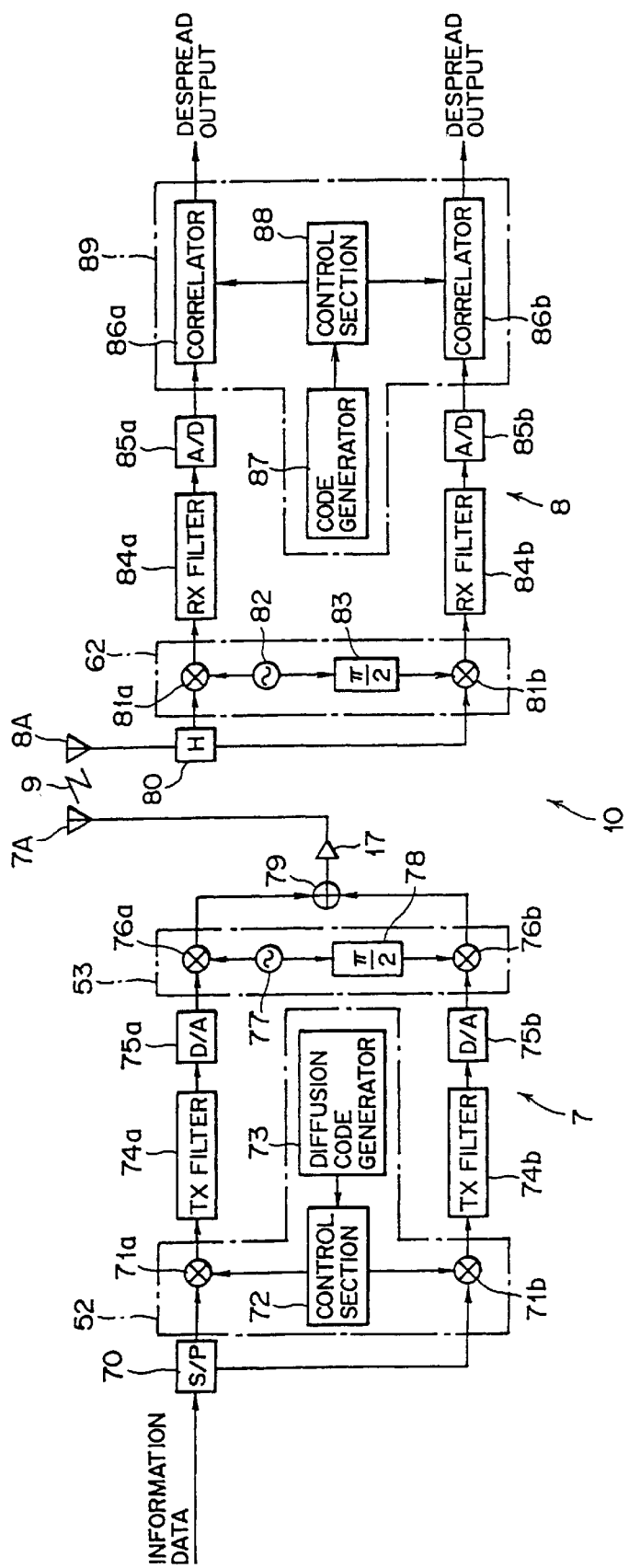
FIG. 13 is a block diagram illustrating the configuration of a common radiocommunication system.

Next, according to a flowchart (steps d1 to d8) illustrated in FIG. 12, an explanation will be hereinbelow given of operation of the spread demodulation section 3 in a case where the mobile station autonomously obtains a code and, more particularly, the operation of the spread demodulation section 3 in a case where the mobile station autonomously acknowledges a plurality of spread codes sequentially according to a given threshold value and given SI ratio information.

First, a threshold value is initialized (step d1). After setting of a composite code(step d1'), an integrated and dumped value output from the correlators 5a and 5b or an estimated SIR value is inputted (step d2). The value is compared with a corresponding given threshold (step d3). As a result, if the value exceeds the given threshold value (YES in step d3), the threshold value is updated (step d4). If the value is not greater than the given threshold value (NO in step d3), the code composed immediately before this happens is deleted (step d5).

It is decided whether or not determination of all the codes has been completed (step d6), and if the determination is not completed (NO in step d6), the spread demodulation section 3 forms the next composite code (step d7) and the processing of threshold judgment (steps d2 and d3) is performed for the thus-composed code. Also, when it is judged that the determination has been completed for all the codes (YES in step d6), the composite code is outputted (step d8).

As described above, according to the radiocommunication apparatus 1B of the present embodiment, the result of despread processing is compared with a predetermined threshold value (and given SI information). It is possible to autonomously and sequentially acknowledge a plurality of spread codes on the basis of such comparison, and this allows more accurate despread processing. Therefore, the processing performance of the radiocommunication apparatus can be improved.

Figure 9:
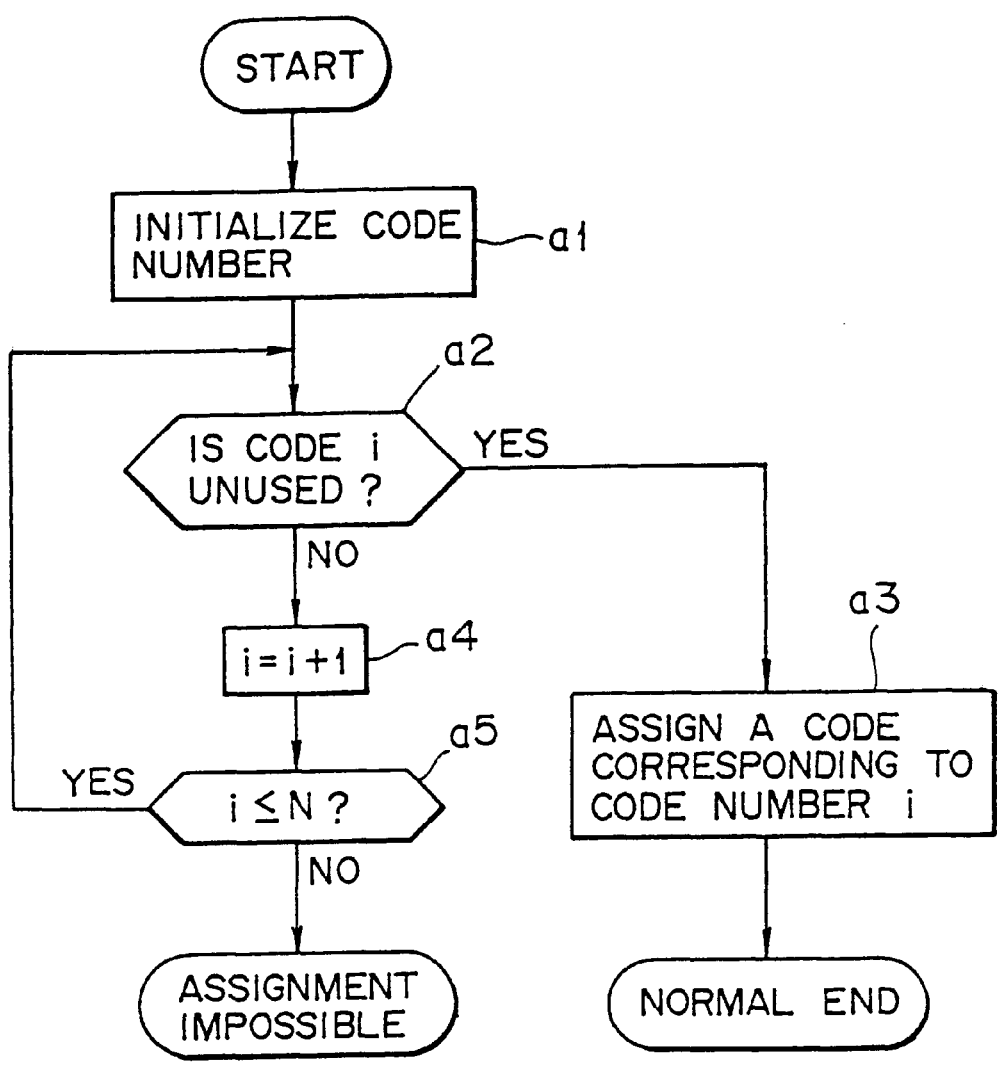
FIG. 9 is a flowchart for explaining an example of the despread processing performed by the spread demodulation section according to the embodiment of the present invention.

According to a flowchart illustrated in FIG. 9 (in steps a1 to a5), an explanation will be hereinbelow given of the operation (assignment method) for selection of spread code information in a predetermined order in the above-described case (A) where the number of codes to be composed is fixed and in the above-described case (C) where codes are autonomously obtained.

First, the code number corresponding to spread code information to be used is initialized (step a1), and it is determined whether or not the code number i is currently used (step a2). If the code number i is not used (YES in step a2), a code corresponding to the code number i is assigned to as the spread code for performing despread processing (step a3).

If the code number i is used (NO in step a2), the code number i is incremented from the initial value (i=i+1; step a4). Subsequently, it is judged whether or not the code number i obtained after it has been incremented is smaller than a maximum number of available codes N (step a5). If the code number i is less than the available number N (YES in step a5), it is again judged whether the incremented code is presently used (step a2).

On the other hand, if the code number i is greater than the maximum number N (NO in step a5), the code corresponding to the code number i cannot be assigned to as the spread code information.

As has been described above, according to the radiocommunication apparatus 1B of the present embodiment, the plurality of types of signals are signals that are spread by spread code information which is selected by the transmitting-side radiocommunication apparatus 1A in a predetermined order, according to the CDMA scheme. Therefore, the amount of computation and the time required to retrieve a code number can be reduced, in turn making it possible to quickly determine a composite code.

Further, as described above, according to the radiocommunication apparatus 1B of the present invention, it is possible to carry out despread processing for a common signal portion through use of a composite spread code formed from a plurality of spread codes while the information signals of the plurality of types of signals are reliably be subjected to despread processing, and this allows considerable improvements in signal-to-noise ratio of a received signal, thereby greatly contributing to improvements in the performance of the radiocommunication apparatus.

What is claimed is:

1. A radiocommunication apparatus comprising:
a receiving section capable of receiving a plurality of types of signals which have been spread through use of different spread code information according to a CDMA scheme in a transmitting-side radiocommunication apparatus, each of said signals containing an information portion which carries information, and a common signal portion for estimating a fading propagation path; and
a spread demodulation section which generates an original spread code if the information signal portion is received by said receiving section and carries out depressed processing for common signal portions of the plurality of types of signals if the common signal portion is received by said receiving section through use of a composite spread code, by a linear composition, formed from a plurality of spread codes which are generated at a receiver.

2. The radiocommunication apparatus according to claim 1, wherein said spread demodulation section comprises a composite spread code generating section for forming a composite spread code from a plurality of spread codes, and a despread processing computing section which carries out despread processing for the common signal portions of the plurality of types of signals received by said receiving section through use of the composite spread code generated by said composite spread code generating section.

3. The radiocommunication apparatus according to claim 1, wherein said spread demodulation section performs the despread processing through use of a composite spread code which is formed from a plurality of spread codes corresponding to at least a portion of the plurality of types of signals.

4. The radiocommunication apparatus according to claim 3, wherein said spread demodulation section performs the despread processing through use of a composite spread code which is formed from a plurality of spread codes corresponding to currently-used signals of the plurality of types of signals.

5. The radiocommunication apparatus according to claim 4, wherein said spread demodulation section performs the despread processing through use of a composite spread code which is formed from a plurality of spread codes corresponding to a portion of currently-used signals of the plurality of types of signals, each of said currently-used signals having been notified beforehand from a base station.

6. The radiocommunication apparatus according to claim 3, wherein said spread demodulation section performs the despread processing through use of a composite spread code formed from a plurality of spread codes corresponding to at least a part of signals of the plurality of types of signals regardless of whether or not they are being currently used.

7. The radiocommunication apparatus according to claim 1, wherein said spread demodulation section is previously notified of information regarding a plurality of spread codes through a control information sent from said transmitting-side radiocommunication apparatus.

8. The radiocommunication apparatus according to claim 1, wherein said spread demodulation section autonomously acknowledges the plurality of spread codes.

9. The radiocommunication apparatus according to claim 1, wherein said spread demodulation section autonomously acknowledges the plurality of spread codes prior to the despread processing.

10. The radiocommunication apparatus according to claim 9, wherein said spread demodulation section autonomously acknowledges the plurality of spread codes beforehand by executing at least an integrate-and-damp operation and computational operation with regard to the received signal with use of the plurality of spread code information.

11. The radiocommunication apparatus according to claim 10, wherein said spread demodulation section autonomously acknowledges the plurality of spread codes beforehand by executing predetermined integrate-and-damp operations with regard to the received signal through use of the plurality of spread code information.

12. The radiocommunication apparatus according to claim 10, wherein said spread code is a Walsh code, and said spread demodulation section executes computational operation according to fast Hadamard transform as the predetermined computational operation.

13. The radiocommunication apparatus according to claim 1, wherein said spread demodulation section autonomously acknowledges the plurality of spread codes sequentially at the time of despread processing.

14. The radiocommunication apparatus according to claim 13, further comprising:

a despread processing computing section which carries out despread processing for common signal portions of the plurality of types of signals received by said receiving section through use of the composite spread code generated, wherein said spread demodulation section is inputted with the result of the despread processing by said despread processing computing section and compares the result of the despread processing with a predetermined threshold value which has been set beforehand, and autonomously acknowledges the plurality of spread codes sequentially on the basis of the result of such comparison.

15. The radiocommunication apparatus according to claim 13, wherein said spread demodulation section compares the result of the despread processing with predetermined SI ratio information, and autonomously acknowledges the plurality of spread codes sequentially on the basis of the result of such comparison.

16. The radiocommunication apparatus according to claim 1, wherein said plurality of types of signals are signals spread by spread code information which is selected in a predetermined order according to the CDMA scheme in said transmitting-side radiocommunication apparatus.

17. A radiocommunication system comprising:

a first radiocommunication apparatus capable of sending a plurality of types of signals which have been spread through use of different spread code information according to a CDMA scheme, each of said signals containing an information portion which carries information, and a common signal portion for estimating a fading propagation path; and a second radiocommunication apparatus including a receiving section capable of receiving the plurality of types of signals from said first radiocommunication apparatus, and a spread demodulation section which generates an original spread code if the information signal portion is received by said receiving section, and carries out despread processing for common signal portions of the plurality of types of signals if the common signal portion is received by said receiving section through use of a composite spread code, by a linear composition, formed from a plurality of spread codes which are generated at a receiver.

18. A radiocommunication apparatus comprising:

a receiving section capable of receiving a plurality of types of signals which have been spread through use of different spread code information according to a DMA scheme in a transmitting-side radiocommunication apparatus, each of said signals containing an information symbol which have information, and a pilot signal for estimating a fading propagation path; and a spread demodulation section which generates an original spread code if the information symbol is received by said receiving section, and carries out despread processing for pilot signals of the plurality of types of signals if the pilot signal is received by said receiving section through use of a composite spread code, by a linear composition, formed from a plurality of spread codes which are generated at a receiver.

19. A method of despread processing in a radiocommunication apparatus which comprises a receiving section for receiving a plurality of types of signals which have been spread through use of different spread code information according to a CDMA scheme in a transmitting-side radiocommunication apparatus and a common signal portions for estimating a fading propagation path, and a spread demodulation section for carrying out despread processing for common signal portions of the plurality of types of signals if the pilot signal is received by said receiving section through use of a composite spread code formed from a plurality of spread codes, comprising the steps of:

at the receiving section,
(a) receiving the plurality of types of signals; and at the spread demodulation section,
(b) carrying out despread processing for common signal portions of the plurality of types of signals, each of said signals being received at said receiving step (a) through use of a composite spread code.

* * * * *